Dec. 16, 1930.  J. F. PERSINGER  1,785,323
NONSKID CHAIN TIGHTENER
Filed April 19, 1929
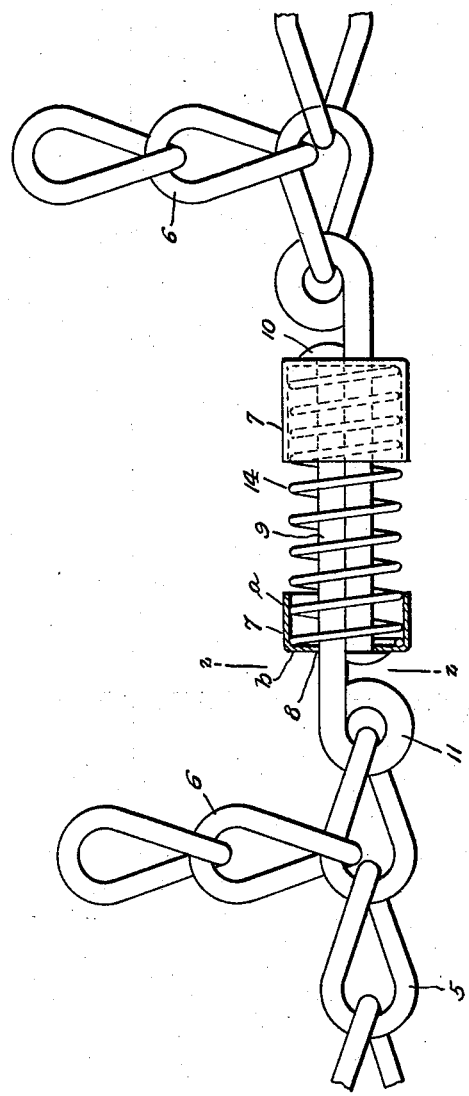
Inventor
James F. Persinger,
By Clarence A. O'Brien
Attorney Patented Dec. 16, 1930

1,785,323

UNITED STATES PATENT OFFICE

JAMES F. PERSINGER, OF LANDER, WYOMING

NONSKID-CHAIN TIGHTENER

Application filed April 19, 1929. Serial No. 356,490.

The present invention relates to an automatic chain tightener and has for its prime object to provide means for keeping the nonskid chain snug at all times, about the automobile tire.

Another very important object of the invention resides in the provision of an improved structure of this nature which is simple, inexpensive to manufacture, strong and durable, and thoroughly efficient and reliable in use.

With the above and numerous other objects in view as will appear as the description proceeds, the invention resides in certain novel features of construction as will be hereinafter more fully described and claimed.

In the drawings:

Figure 1 is a fragmentary plan view of a non-skid chain, showing my improved device incorporated therein, and Figure 2 is a detail section taken substantially on the line 2—2 of Figure 1.

Referring to the drawings in detail, it will be seen that the numeral 5 denotes a longitudinal chain and numeral 6 cross chains. This chain 5 has incorporated therein my improved device, which may be duplicated as many times as is desired.

This improved device comprises a pair of cup-shaped members 7 each of which has a cylindrical body A, and a single end disc B which is provided with a pair of adjoining off-center circular openings 8. A pair of bolts 9 are slidable through the openings 8 and have at their ends head 10 and eyes 11. The head 10 of one bolt is oppositely disposed with respect to the head of the other bolt and the same is true of the eyes. The heads are formed with notches 12 to receive the bolts so that they may lie alongside of each other in close relationship. A coil spring 14 is disposed about the bolts and impinges against the discs B of the small cup-shaped members 7 and thus when the eyes 11 are pulled away from each other, the spring 14 is under tension and thus the spring will assist in holding the non-skid chain tightly and firmly about the tire. The eyes 11, are engaged with the adjacent links of the remaining portions of the longitudinal chain 5.

It is thought that the construction, utility and advantages of this invention will now be quite apparent to those skilled in this art without a more detailed description thereof. The present embodiment of the invention has been described in considerable detail merely for the purpose of exemplification, since in actual practice it attains the features of advantage enumerated as desirable in the statement of the invention and the above description.

It will be apparent that changes in the details of construction may be resorted to without departing from the spirit or scope of the invention as hereinafter claimed.

Having thus described my invention, what I claim as new is:

A spring device of the class described comprising a pair of cup shaped members each including cylindrical bodies with one disc end apiece, the disc ends being provided with off center adjoining openings, bolts extending through the openings, heads and eyes on the ends of the bolts, the bolts and the eyes being oppositely disposed, a spring disposed about the bolts and impinging against the disc plates, said heads being formed with notches to receive the bolts, so that said bolts may be disposed close together.

In testimony whereof I affix my signature.

JAMES F. PERSINGER.